Figure 1:
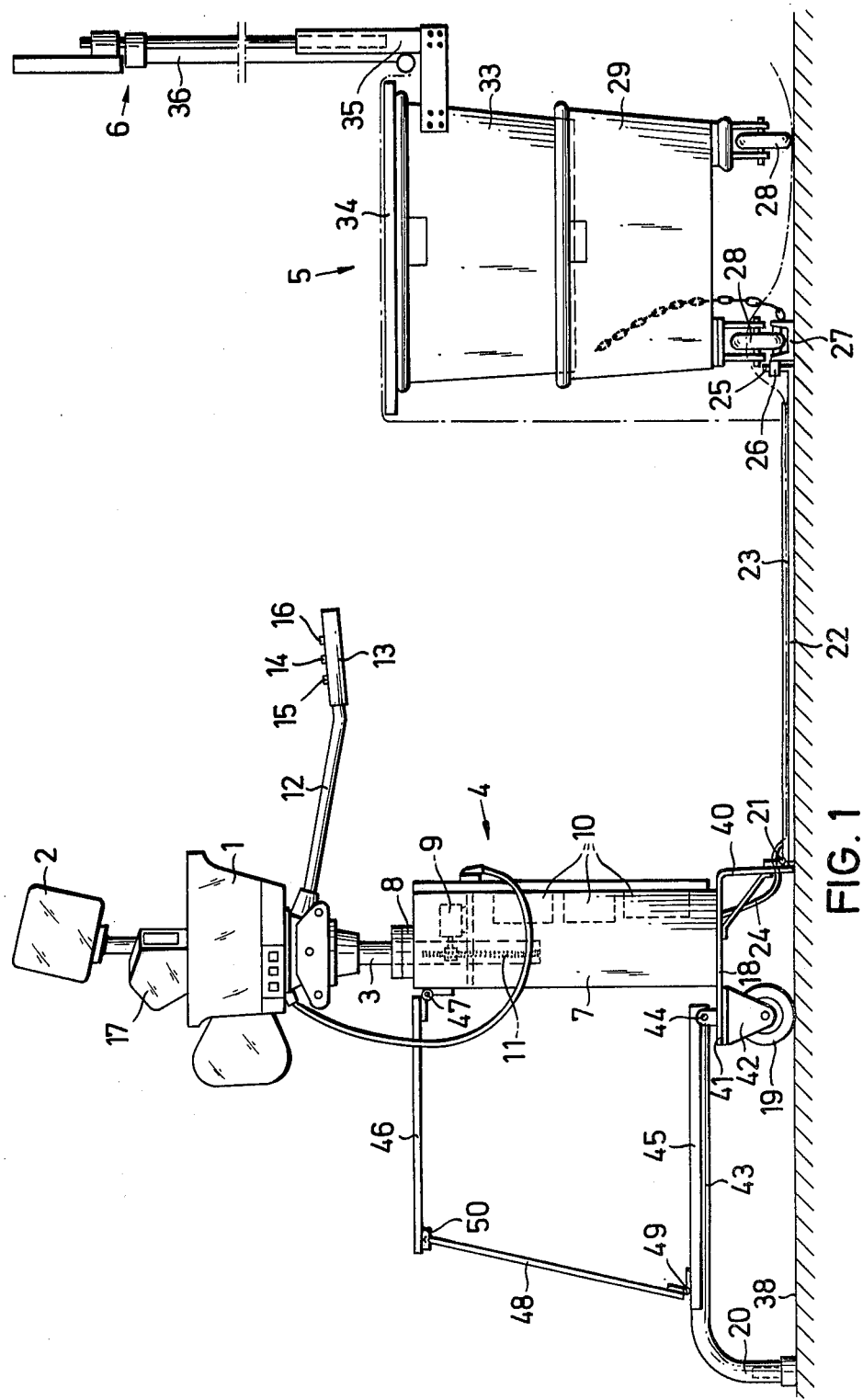

United States Patent [19]

Viering

[11] 4,166,687
[45] Sep. 4, 1979

[54] STAND FOR A STUDIO CAMERA AND A PHOTOGRAPHIC STUDIO EQUIPPED THEREWITH

[75] Inventor: Rudolf Viering, Cologne, Fed. Rep. of Germany

[73] Assignee: Pixyfoto GmbH, Cologne, Fed. Rep. of Germany

[21] Appl. No.: 843,095

[22] Filed: Oct. 17, 1977

[30] Foreign Application Priority Data

Oct. 16, 1976 [DE] Fed. Rep. of Germany ....... 2646789

[51] Int. Cl.² ...................... G03B 15/00; G03B 17/00
[52] U.S. Cl. .................................. 354/290; 354/292; 354/293
[58] Field of Search ........................ 354/293, 290–292, 354/80–82; 352/243; 248/11, 129; 280/47.37 R, 79.1 A

[56] References Cited

U.S. PATENT DOCUMENTS

| | | | |
|---|---|---|---|
| 1,799,866 | 4/1931 | Roth | 354/290 |
| 2,932,478 | 4/1960 | Krieger | 354/293 X |
| 2,990,764 | 7/1961 | Wilder | 354/81 X |
| 4,037,763 | 7/1977 | Turchen | 352/243 X |

FOREIGN PATENT DOCUMENTS

994817  11/1951  France ...................................... 354/293

*Primary Examiner*—John Gonzales
*Attorney, Agent, or Firm*—Ladas, Parry, Von Gehr, Goldsmith & Deschamps

[57] ABSTRACT

A stand for a studio camera comprises a column which supports the camera and which can be raised and lowered, and a housing in which are accommodated the bearing arrangement and the raising and lowering device for the column as well as electrical switching, control and safety devices for the studio camera and for a flash appliance. The stand is adapted to be traversible by means of wheels provided on the housing and has a spacer which is pivotable about a horizontal axis into the base plane. An alignment rail for a subject table can be applied to the free end of the spacer, and the spacer is provided with a longitudinally extending cable duct leading from the subject table to the stand.

14 Claims, 6 Drawing Figures

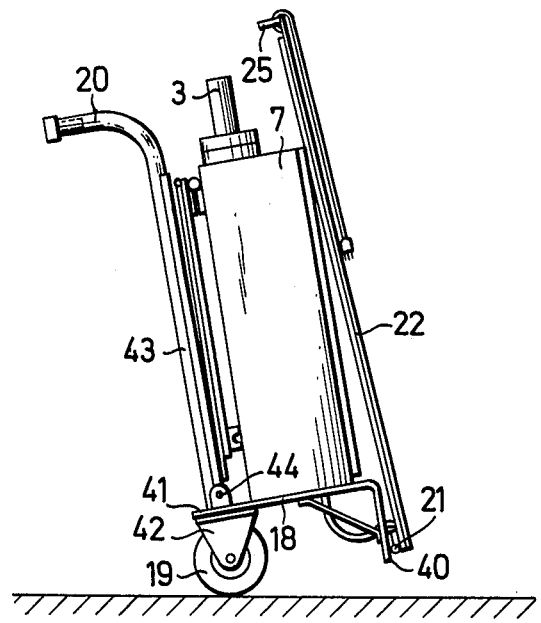
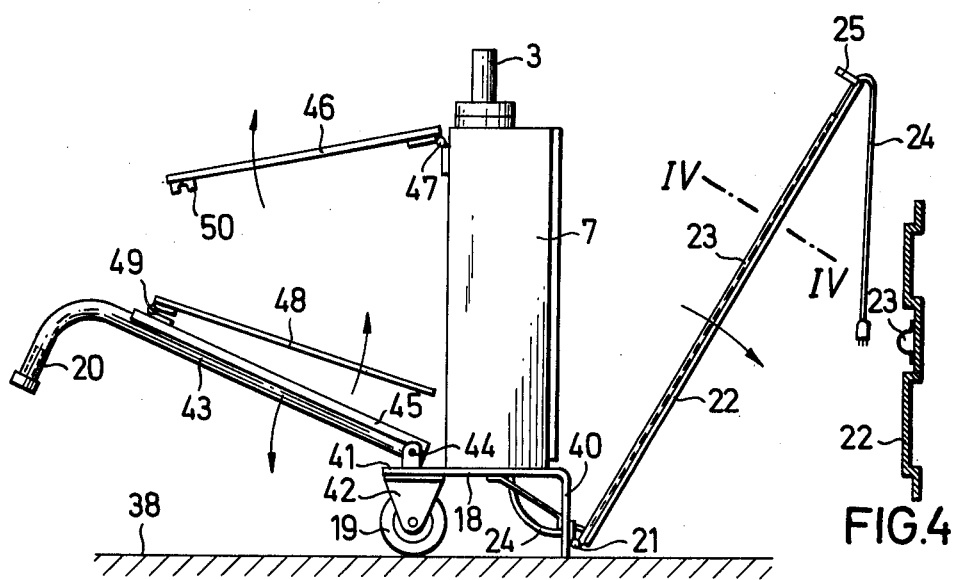

U.S. Patent  Sep. 4, 1979  Sheet 3 of 3  4,166,687

STAND FOR A STUDIO CAMERA AND A PHOTOGRAPHIC STUDIO EQUIPPED THEREWITH

The invention relates to a photographic studio and a stand for a studio camera having a column which supports the camera and which can be raised and lowered, and a housing in which are accommodated the bearing arrangement and the raising and lowering device for the column as well as electrical switching-, control- and safety devices for the studio camera and for a flash appliance. Such stands are installed fixedly in place and consequently are spaced by a fixed distance from the subject table, in order that the photographic conditions regarding both the distance from the subject to be photographed and also the lighting of the subject effected by a flash appliance may at all times remain constant and be at an optimum.

The known stands of the kind hereinbefore mentioned have the disadvantage that their installation is laborious and time-consuming. During the installation of the stand, the electric cables leading to the stand have to be sunk into the floor in such a way that they do not get in the way and that no one trips over them.

The object of the present invention is to create a mobile photographic studio in which the stand may also, without difficulty, be transported by one person and erected in a short space of time at a fixed distance from the subject table, which is also constructed so as to be readily transportable.

In accordance with the invention, this object is fulfilled by adapting the stand to be traversable by means of wheels provided on the housing and arranging it to have a spacer which is pivotable about a horizontal axis into the base plane, to the free end of which an alignment rail for a subject table can be applied and which is provided with a longitudinally extending cable duct leading from the subject table to the stand.

This stand has the advantage that, when the spacer is upwardly pivoted, it can, by pivoting it, readily be traversed on its wheels by one person only and that the stand can be directed in any location with difficulty at a precisely predetermined distance from the subject table. The electric cable, which connects the electrical apparatus accommodated in the housing of the stand to the power supply, is accommodated in the spacer in such a way that it does not get in the way of the photographer who at times works in front of the subject table, in the course of her work. The downwardly pivotable spacer, which is connected to the subject table via the alignment rail, provides the stand with a high degree of steadiness, so that the stand cannot be displaced even when, for example, someone inadvertently bumps into it.

Advantageously there are hinged to the stand cantilever-like jibs, whose free ends can be pivoted right down to the base plane and secured in this position. With the aid of these jibs, the steadiness of the stand is further increased. Desirably the free downwardly-pivotable ends of the jibs are constructed in the form of handgrips and the jibs are adapted to be bolted in a position in which they are pivoted on to the stand in such a way that, when the spacer is pivoted in like manner, the stand can be moved on its two wheels in a manner similar to a hand-cart.

Moreover the stand may be so constructed that, with the jibs downwardly pivoted a table is formed at the level of the top of the housing and a support plate at the level of the floor of the housing. The lower support plate as well as the table top may be used for receiving film material, utensils and the like. The table top may moreover be used as a writing surface. Further characteristics of the invention are apparent from claims 2 to 10.

Figure 5:
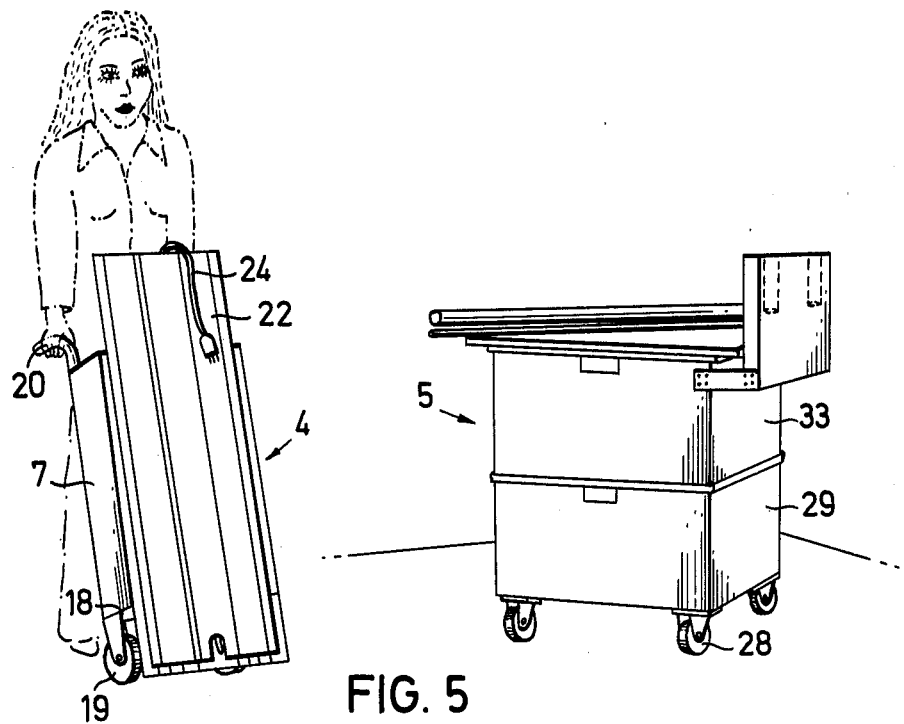
Figure 6:
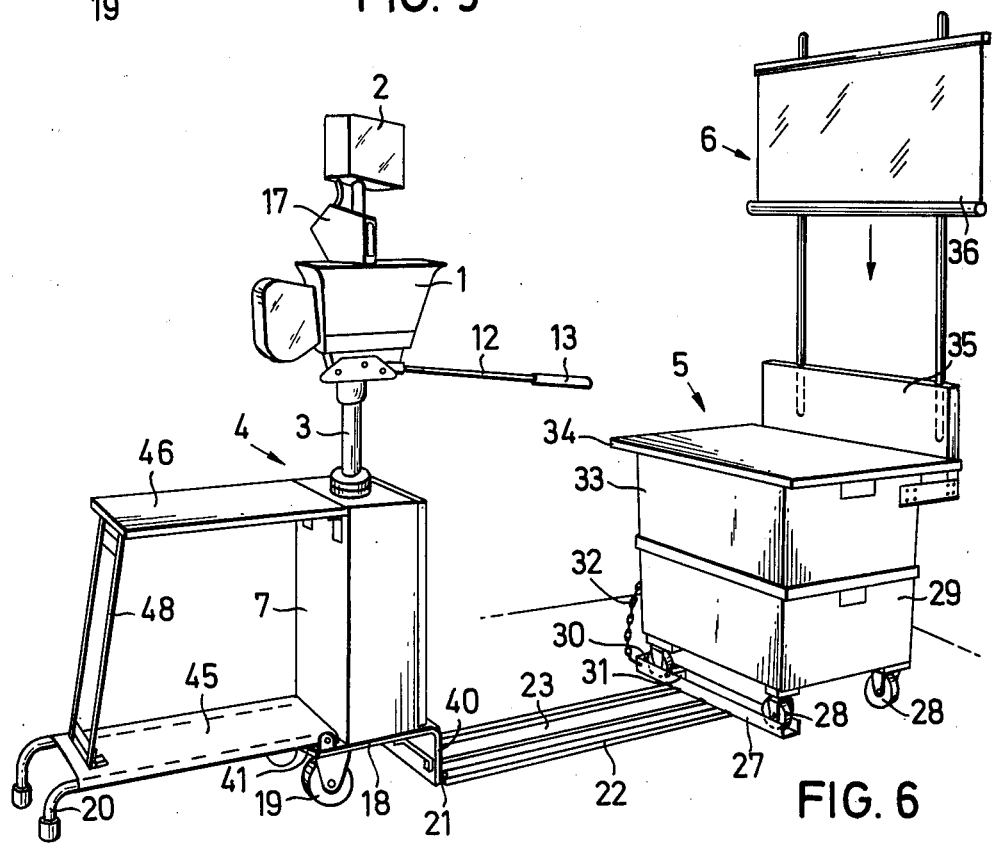

In the following description an embodiment of the invention will be described in greater detail with reference to the drawings, in which:

FIG. 1 is a side view of the stand and of the subject table in the arrested condition, FIG. 2 is a side view of the stand according to FIG. 1 in its transporting position, FIG. 3 is a side view of the stand according to FIG. 1 during the erection phase, FIG. 4 is a view on the section line IV—IV in FIG. 3, FIG. 5 is a perspective view of the stand and of the subject table in their transporting position, FIG. 6 is a perspective view of the stand and of the subject table in their erected condition.

The studio camera 1 with a flash appliance 2 is supported by a column 3, which can be raised and lowered, of a stand 4, which is constructed so that it can be folded together and traversed. A subject table 5 with a background wall 6 is also constructed so as to be collapsible and traversible.

As is shown in particular in FIG. 1, the stand 4 has a housing 7, which is of a substantially square plan and 60 to 80 cm high, to which the bearing arrangement 8 for the column 3 is secured and in which a stroke- and lowering device 9 for the column 3, adapted to be driven by an electric motor, as well as electrical switching-, control-, regulating- and safety appliances 10 for the camera 1 and the flash appliance 2 are accommodated. The electric motor, drives the pinion which meshes with a rack 11 secured to the column 3.

The studio camera 1 is supported by the column 3 via a so-called tilting head. The camera is provided with an operating lever 12, with the aid of which the camera 1 can be directed on to the subject disposed on the subject table 5, by pivoting about a vertical and a horizontal axis. On the handgrip 13 of the operating lever 12 there is provided a pushbutton 14 for setting, by means of an electric motor, a zooming objective, a signal button 15 for switching a light signal on and off, which attracts the attention of, for example, a small child to be photographed, so that it will look into the camera 1, and a tripping button 16, by means of which the camera shutter is opened for a brief period and a flash is actuated. The required image containing the subject can be viewed through the view-finder 17 from the subject table 5, so that, for photographing a small child, only one person is required who basically needs to concentrate only on the small child to be photographed and has a psychological effect on the child such that it will display a lively and characteristic expression.

In order that the mobile photographic studio may rapidly and accurately be erected in a manner providing optimum operating conditions, wheels 19 are provided on the reinforced sheet metal floor 18 of the housing 7 and grips 20 are provided on the stand 4, which enable the stand 4 in its pivoted position to be transported in the manner of a hand-cart. There is moreover hinged to the stand 4 a flat spacer 22, which is pivotable about a horizontal axis 21 and which fixes the distance between the stand 4 and the subject table 5.

The spacer 22 consists of a beaded sheet metal member and has a longitudinally extending cable duct 23, through which a cable 24 is lead from the housing 7 as far as the subject table 5. At the free, pivotable end of the spacer 22, abutments 25 are provided, which are upwardly angled at right angles and which engage in eyes 26 or in recesses in an alignment rail 27.

The alignment rail 27 is of U-shaped cross-section and extends over the width of the subject table 5, so that two of the four wheels 28 of the lower, traversable portion 29 of the subject table can be inserted into the alignment rail 27.

As shown in FIG. 6, there are provided in the alignment rail 27 two abutments 30 and 31, which fix one of the two wheels 28 of the subject table, which are to be inserted into the alignment rail 27, in such a way that the subject table 5 is not only fixed at the correct distance from the camera 1, but also that it is so aligned that the central planes of the stand 4 and of the subject table 5 coincide. On the lower portion 29 the alignment rail 27 is secured via a chain 32 or the like in such a way that the rail 27 can only be joined correctly and not laterally angularly displaced to the abutments 25 of the spacer 22.

The subject table 5 consists of the traversable lower portion 29 of bucket-like construction, an upper portion 33 which is inserted therein and also in the form of a bucket, a table-top 34 placed thereon and a framework 35, secured to the upper portion 33, for mounting a background wall 36.

As shown in FIG. 5, the camera complete with viewfinder, as well as the flash, the alignment rail and additional utensils can be accommodated in the bucket-like portions 29 and 33 of the subject table 5, for the purpose of transporting the photographic studio. All the parts which are required for the operation of a photographic studio can thus be wheeled about on the wheels 19 of the stand and the wheels 28 of the subject table 5.

As shown in FIGS. 1, 2 and 3, the housing 7 is arranged on a reinforced sheet metal floor 18, which is angled at the side which is to face the subject table 5, down to the base plane 38, the spacer 22 being hinged to the angled portion 40 for pivoting about the axis 21. The sheet metal floor 18 protrudes beyond the plan of the housing 7 at the side which is to face away from the subject table 5 and to the underside of the protruding portion 41 the bearings 42 for the wheels 19 are secured and to the upper side of the protruding portion 41, two jibs 43 are hinged for pivoting about a horizontal axis 44, their free ends being angled substantially at right-angles and forming handgrips 20. The jibs 43 are—as shown in FIG. 1—securable not only in the position in which they are pivoted on to the base plane 38, but also—as shown in FIG. 2—, in the position in which they are pivoted so as to lie against the housing 7. For securing the jibs 43 known securing means are used, such as hinged securing hooks or the like.

The jibs 43 are interconnected by a plate 45. In the downwardly pivoted position of the jibs 43 the plate 45 serves as a storage surface.

At the upper end of the housing 7 there is hinged about a pivot axis 47, parallel to the pivot axis 44 of the jibs 43, a table-top 46, which is securable in its outwardly pivoted position by means of a support frame 48 which abuts against the jibs 43. The support frame 48 is secured to the jibs for pivoting about an axis 49, parallel to the axes 44 and 47, and the free end of the support frame 48 is arranged to be latched in a mounting 50 provided below the table-top 46.

I claim:

1. A stand for a studio camera, having a column which supports the camera and which can be raised and lowered, and a housing in which are accommodated the bearing arrangement and the raising and lowering device for the column as well as electrical switching-, control- and safety devices for the studio camera and for a flash appliance, characterised in that the stand (4) is adapted to be traversable by means of wheels (19) provided on the housing (7) and that it has a spacer (22) which is pivotable about a horizontal axis (21) into the base plane, to the free end of which an alignment rail (27) for a subject table (5) can be applied and which is provided with a longitudinally extending cable duct (23) leading from the subject table (5) to the stand (4).

2. A stand according to claim 1, characterised in that the housing (7) is of substantially square plan and that the spacer (22) is hinged at its side which is to face the subject table and that, at its side which is to face away from the subject table, two wheels are spacedly supported in bearings and that above these wheels in the upper region of the housing (7) two hand grips (20) are provided which are spaced from the wheels (19).

3. A stand according to claim 1, characterised in that the housing (7) is arranged on a reinforced sheet metal floor (18) which is angled at the side which is to face the subject table (5) as far as the base plane (38) and that the spacer (22) is hinged to the angled portion (40).

4. A stand according to claim 1, characterised in that the housing (7) is arranged on a reinforced sheet metal floor (18) which protrudes beyond the plan of the housing at the side which is to face away from the subject table (5) and that the bearings (42) of the wheels (19) are secured to the underside of the protruding portion (41) and that at the upper side of the protruding portion (41) jibs (43) are hinged for pivoting about a horizontal axis (44), their free ends being angled substantially perpendicularly and forming the hand grip (20) and being securable in a position in which they lie against the housing (7) as well as in a position in which they are pivoted into the base plane (38) by means of locking means known per se.

5. A stand according to claim 4, characterised in that the jibs (43) are interconnected by a plate (45).

6. A stand according to claim 4, characterised in that at the upper end of the housing (7) there is hinged for pivoting about an axis (44), parallel to the pivot axis (47) of the jibs (43), a table top (46), which can be fixed in an opened up position by means of a support frame (48) which abuts against the jibs (43).

7. A stand according to claim 6, characterised in that the support frame (48) is secured to the jibs (43) for pivoted about an axis (49), parallel to the axes (44) and (47) and that the free end of the support frame (48) is arranged to be latched in a mounting (50) provided below the table top (46).

8. A stand according to claim 1, characterised in that the alignment rail (27) which is connectable to the spacer (22) is of upwardly-open U-section.

9. A stand according to claim 8, characterised in that abutments (30, 31) for positioning a wheel of the subject table (5) are provided in the U-shaped alignment rail (27).

10. A stand according to claim 1, characterised in that the spacer (22) is in the form of a sheet steel member provided with longitudinal beads, said member being hinged to the lower end of the angled portion (40) of the sheet metal floor (18) for pivoting through approximately 90°.

11. A photographic studio having a stand according to claim 1, characterised in that the subject table (5) is made up of a bucket-like lower portion (29), at the corners of which four wheels (28) are provided, at least two of which are dirigible, and of a table top (34) which is adapted to be positively applied to the top of the lower portion (29).

12. A photographic studio having a stand according to claim 11, characterised in that a bucket-shaped upper portion (33), on the upper margin of which the table top (34) is adapted to be positively laid, is adapted to be applied to the top of the bucket-shaped lower portion (29) which is provided with wheels.

13. A photographic studio having a stand according to claim 12, characterised in that a framework (35) for receiving a background wall (36) is secured to the bucket-like upper portion (33).

14. A photographic studio having a stand according to claim 11, characterised in that the alignment rail (27) is securely connected to the bucket-like lower portion (29) via a chain or cable (32).

* * * * *